(12) United States Patent
Niekerk et al.

(10) Patent No.: US 7,917,128 B2
(45) Date of Patent: Mar. 29, 2011

(54) METHOD AND SYSTEM FOR INSERTING A MULTIMEDIA MESSAGE MULTIPLE ELEMENT INTO A MULTIMEDIA MESSAGE

(75) Inventors: Sabine Van Niekerk, Salzgitter (DE); Norbert Schwagmann, Braunschweig (DE); Belhassen Jerbi, Ebersberg (DE)

(73) Assignee: Siemens Aktiengesellschaft, Munich (DE)

( * ) Notice: Subject to any disclaimer, the term of this patent is extended or adjusted under 35 U.S.C. 154(b) by 984 days.

(21) Appl. No.: 10/543,526

(22) PCT Filed: Jan. 8, 2004

(86) PCT No.: PCT/EP2004/000073
§ 371 (c)(1),
(2), (4) Date: Apr. 28, 2006

(87) PCT Pub. No.: WO2004/068878
PCT Pub. Date: Aug. 12, 2004

(65) Prior Publication Data
US 2006/0195505 A1    Aug. 31, 2006

(30) Foreign Application Priority Data
Jan. 31, 2003   (DE) ................... 103 03 958

(51) Int. Cl.
*H04M 3/42* (2006.01)
(52) U.S. Cl. ............... 455/414.1; 455/412.1; 455/414.3; 455/412.2; 379/88.13; 379/900; 709/203; 709/206; 725/114; 725/118
(58) Field of Classification Search ............... 455/412.1, 455/414.1, 550.1, 466, 436, 566; 709/203, 709/206; 705/14; 725/114, 91, 118, 119, 141, 153, 136; 379/900, 67.1, 188.13
See application file for complete search history.

(56) References Cited

U.S. PATENT DOCUMENTS

| 5,778,187 | A | | 7/1998 | Monteiro et al. |
| 6,052,710 | A | * | 4/2000 | Saliba et al. ................. 709/203 |
| 6,058,428 | A | * | 5/2000 | Wang et al. ................... 709/232 |

(Continued)

FOREIGN PATENT DOCUMENTS

EP    0762710 A2    3/1997

(Continued)

OTHER PUBLICATIONS

3GPP. (Jun. 2002). "3rd Generation Partnership Project; Technical Specification Group Terminals; Multimedia Messaging Service (MMS); Functional Description; Stage 2 (Release 6)," 3GPP TS 23.140 V6.0.0, Valbonne, France, pp. 1-155.

*Primary Examiner* — Kamran Afshar
*Assistant Examiner* — Babar Sarwar
(74) *Attorney, Agent, or Firm* — King & Spalding L.L.P.

(57) ABSTRACT

The invention relates to a method and system for inserting at least one multimedia message multiple element into a multimedia message. The method comprises the following steps transmitting at least one multimedia message multiple from a network element to a mobile station, transmitting one first multimedia message from the network element to the mobile station, and inserting the multimedia message multiple element into the first multimedia message. Preferably, insertion occurs in the mobile station, and the multimedia message multiple element is only transmitted once by the network element to the mobile station and is inserted into a plurality of multimedia messages.

38 Claims, 9 Drawing Sheets

U.S. PATENT DOCUMENTS

| | | | |
|---|---|---|---|
| 6,139,177 A * | 10/2000 | Venkatraman et al. | 700/83 |
| 6,564,249 B2 * | 5/2003 | Shiigi | 709/206 |
| 6,704,930 B1 * | 3/2004 | Eldering et al. | 725/36 |
| 7,072,984 B1 * | 7/2006 | Polonsky et al. | 709/246 |
| 7,653,744 B2 * | 1/2010 | Kanefsky et al. | 709/245 |
| 7,653,748 B2 * | 1/2010 | Borger et al. | 709/246 |
| 7,844,907 B2 * | 11/2010 | Watler et al. | 715/762 |
| 2001/0041578 A1 * | 11/2001 | Na | 455/466 |
| 2002/0006793 A1 * | 1/2002 | Kun-Szabo et al. | 455/426 |
| 2002/0077130 A1 * | 6/2002 | Owensby | 455/466 |
| 2003/0005052 A1 * | 1/2003 | Feuer et al. | 709/204 |
| 2003/0014310 A1 * | 1/2003 | Jung et al. | 705/14 |
| 2004/0092273 A1 * | 5/2004 | Valloppillil | 455/466 |
| 2004/0153517 A1 * | 8/2004 | Gang et al. | 709/206 |
| 2006/0010466 A1 * | 1/2006 | Swix et al. | 725/32 |

FOREIGN PATENT DOCUMENTS

| | | |
|---|---|---|
| EP | 1107618 A2 | 6/2001 |
| EP | 1220132 A2 | 7/2002 |
| EP | 1261180 A2 | 11/2002 |
| WO | WO-98/19438 A1 | 5/1998 |

* cited by examiner

METHOD AND SYSTEM FOR INSERTING A MULTIMEDIA MESSAGE MULTIPLE ELEMENT INTO A MULTIMEDIA MESSAGE

CLAIM FOR PRIORITY

This application claims the benefit of priority to German Application No. 103 03 958.9 which was filed in the German language on Jan. 31, 2003, the contents of which are hereby incorporated by reference.

TECHNICAL FIELD OF THE INVENTION

The present invention relates to a method and a system for inserting at least one multimedia message multiple element into a multimedia message.

BACKGROUND OF THE INVENTION

In addition to voice telephony, the GSM (Global System for Mobile Communications) mobile radiocommunication system offers the possibility of sending or receiving, as applicable, short text messages of up to 160 characters in length. This message service is known as SMS (Short Message Service). For the next generation of mobile radiocommunication systems (2.5G and 3G), such as for example UMTS (Universal Mobile Telecommunications System), a variant of a mobile messaging service is provided with multimedia capability, the so-called MMS (Multimedia Messaging Service). This MMS service is described in the technical specifications TS 22.140 Version 4.1.0, Release 4, and TS 23.140 Version 4.5.0, Release 4, from the $3^{rd}$ Generation Partnership Project (3GPP).

To delimit them more clearly from the SMS text messages, messages with multimedia content are referred to in what follows as multimedia messages, MMs. By contrast with SMS, there is no restriction to a purely text content for these. With MMs, it is possible to format texts in accordance with the individual's taste, and to embed audio and video content in a message. Accordingly, an MM can consist of several MM elements with different file types (e.g. audio or still image) or file formats (e.g. for a still image the Graphic Interchange Format GIF, or Joint Photographic Experts Group JPEG). Each MM has a header (MM header) and each MM element has in addition yet another header of its own (MM element header).

Figure 1:
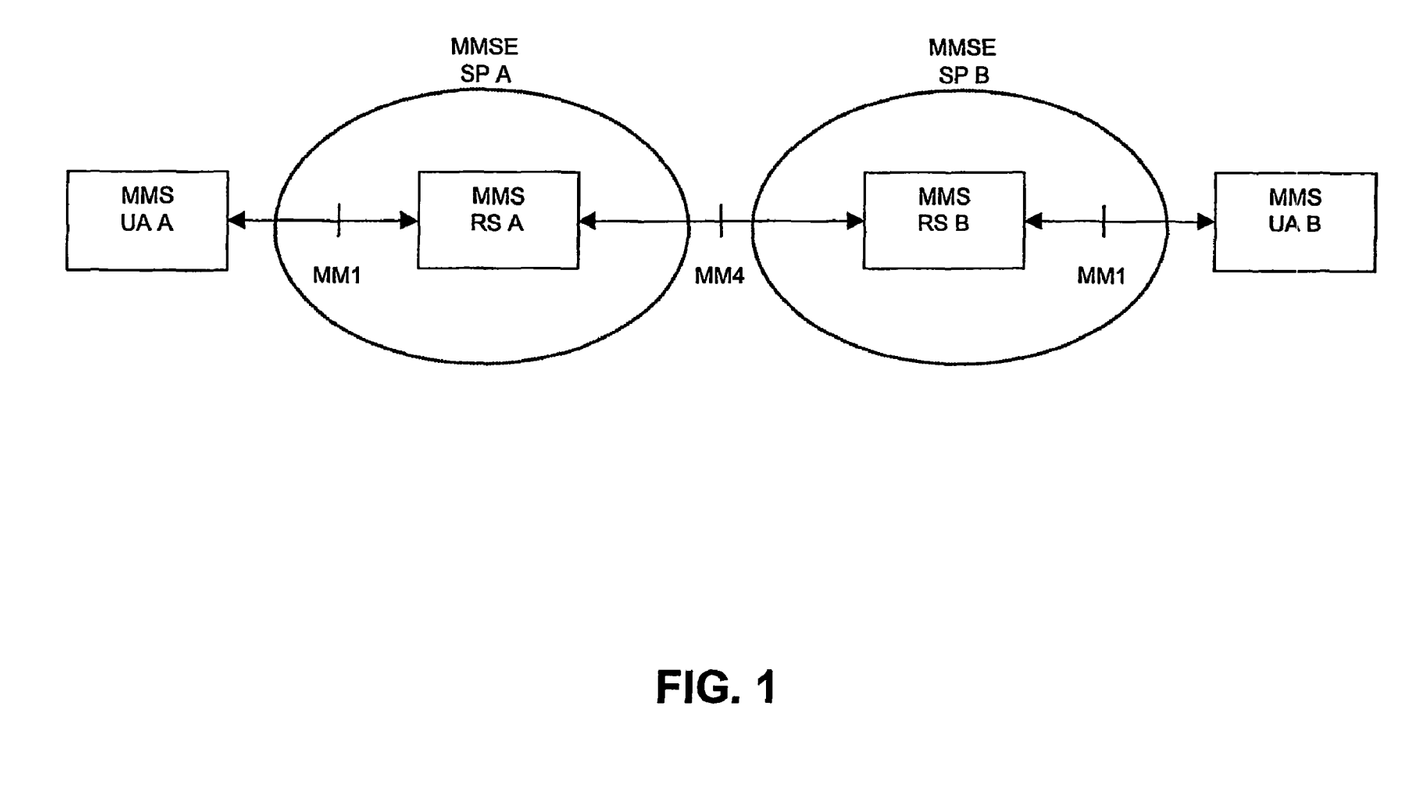
FIG. 1 an MMs network architecture in accordance with 3GPP.

FIG. 1 shows a known MMS network architecture with two networks A and B, from the point of view of the 3GPP. MMS UA stands for a so-called MMS User Agent, i.e. a software program, for example on a mobile radio device or on a device connected to a mobile radio device (e.g. a laptop or similar), which realizes the functionalities for a MMS. Such functionalities can be, for example, generate, view or receive an MM, or send an MM, as applicable. MMS RS is a so-called MMS Relay/Server, i.e. a network element which is within the MMSE (Multimedia Messaging Service Environment) of the MMS service provider, i.e. service environment of the MMS service provider, MMSE SP, which makes the MMS functionality available to the MMS UAs. MM1 and MM4 are interfaces.

Mobile telecommunication systems, such as for example GSM or UTMS, use defined cards, so-called smart cards, which must be plugged into a mobile radio device in order to be able to make use of the services of a network operator with which one is registered. Also stored on this card are user settings and personal data (telephone book, SMS etc.). In the case of GSM, this card is called a SIM (Subscriber Identity Module) card. In the case of UMTS, a distinction is made between the physical UICC card (Universal Integrated Circuit Card) and its logical functionality, the USIM (UMTS Subscriber Identity Module).

SAT (SIM Application Toolkit) or USAT (USIM Application Toolkit), for GSM or UMTS respectively, is a toolkit which provides network operators with interfaces, so-called APIs (Application Programming Interfaces) for the purpose of programming applications. USIM Application Toolkits are, for example, described in the technical specification TS 31.111 Version 4.2.1, Release 4 from the 3GPP. With these APIs, network operators can implement their own applications on the SIM or UICC, as applicable, and with the help of USAT these can access the functionality of the mobile radio device—independently of the manufacturer of the mobile radio device and the manufacturer of the card. The SIM or the UICC card respectively is the physical basis for this toolkit, because it is provided by the network operators, and thus can be adapted as they wish.

Today, network operators already have the ability to transmit MMs together with advertising messages. However, a problem in doing so is that any transmission of advertising messages must take place over the air interface, so that system resources are consumed by the advertising.

In addition, it can happen that an MM element (e.g. a text file, video file or music file as advertising) is to be inserted into several MMs, all of which are sent to the same MMS UA. Such an MM element, which can be inserted repeatedly into MMs, is referred to below as a multimedia message multiple element. In a case like this, there is also the disadvantage that valuable system resources are used at the interface (which is part of the interface MM1 in FIG. 1), in order to communicate again the same data, i.e. the same MM element, to the same MMS UA.

SUMMARY OF THE INVENTION

The present invention provides a method and a system for inserting at least one multimedia message multiple element into a multimedia message, which does not unnecessarily load the system resources of a mobile radio system.

In one embodiment of the invention, there is a method for inserting at least one multimedia message multiple element into a multimedia message including transmitting at least one multimedia message multiple element from a network element to a mobile station; transmitting a first multimedia message from the network element to the mobile station; and inserting the multimedia message multiple element into the first multimedia message.

The system for inserting at least one multimedia message multiple element into a multimedia message has facilities for transmitting at least one multimedia message multiple element from a network element to a mobile station, facilities for transmitting a first multimedia message from the network element to the mobile station, and facilities for inserting the multimedia message multiple element into the first multimedia message.

The multimedia message multiple element can in principle be any type of information data, in particular advertising data such as for example texts, tones or video films. The network element will preferably be a connecting unit MMS RS, such as has already been described, or a so-called VASP (Value Added Service Provider). The mobile station can in principle be any type of mobile terminal device, preferably however a UMTS mobile station.

In a preferred embodiment of the present invention, the insertion takes place in the mobile station. This has the advantage that multimedia message multiple elements can be stored in a storage facility in the mobile station and can in each case, when required, be appended to one or more multimedia messages.

In a further embodiment of the present invention, the multimedia message multiple element is transmitted once from the network element to the mobile station, and is inserted into numerous multimedia messages. This approach saves system resources in the mobile radio system, because multimedia message multiple elements need only be transmitted once over the air interface and then, possibly after storage of the information data in a memory in the mobile station, they can be appended to numerous further multimedia messages so that the user of the mobile station gets each of the original multimedia messages with the relevant multimedia message multiple elements.

It is further preferred that the multimedia message multiple element is included in the first multimedia message which is sent. In this form of embodiment, the multimedia message multiple element which is transmitted with the first multimedia message which is sent can be inserted as an addition into further multimedia messages, i.e. which are communicated later.

In another form of embodiment of the present invention, the multimedia message multiple element is included in a second multimedia message which is transmitted. In this case, a special multimedia message which includes this special multimedia message multiple element is transmitted via the air interface. "Second multimedia message" is here not a restriction in terms of the sequence in which the multimedia messages are transmitted. Instead, "second multimedia message" refers in the present case to a further multimedia message, to distinguish it from the first multimedia message.

In another preferred form of embodiment of the present invention, numerous multimedia message multiple elements are transmitted in one multimedia message from the network element to the mobile station. This has the advantage that system resources are again saved, and numerous multimedia message multiple elements can be transmitted at once to a mobile station.

It is further preferred that a multimedia message has a first data field which enables various multimedia message multiple elements to be distinguished. This first data field serves to enable different multimedia message multiple elements to be distinguished. It is conceivable that a multimedia message includes a new multimedia message element header, which is given an identifying number issued, for example, by the network element MMS RS.

It is further preferred that a multimedia message has a second data field, by which a multimedia message multiple element can be assigned to a message group. To enable multimedia message multiple elements to be distinguished from normal multimedia message elements, the multimedia message multiple elements can be specially identified by the network element. It is conceivable for the multimedia message multiple elements to be given an additional multimedia message element header with an appropriate value. For example, it is possible to imagine advertising or special message groups being distinguished. Preferably, the data in the multimedia message's data field will be appended in the network element, preferably the MMS RS.

In another embodiment of the present invention, the multimedia message has a third data field, including data about whether the multimedia message should be presented to the user of the mobile station. To allow for the situation in which a separate multimedia message is transmitted to communicate multimedia message multiple elements from the MMS RS to the MMS UA, the presentation of this multimedia message to the user by the MMS UA should be avoided. This can be achieved by an additional multimedia message header which is preferably inserted by the MMS RS and which requests the MMS UA not to present this multimedia message to the user. After a multimedia message multiple element has been communicated to the MMS UA, it is stored, for example on a smart card ((U)SIM or multimedia card) or in the mobile station.

In a further embodiment of the present invention, a user facility undertakes the storage of a multimedia message multiple element in the mobile station. Preferably, this user facility will be an MMS UA. This user facility will undertake the storage autonomously. From the fact that a multimedia message multiple element includes a new multimedia message element header, the user facility knows that it should store this multimedia message multiple element under an appropriate reference on an available storage medium.

In another embodiment, storage of a multimedia message multiple element in the mobile station is organized and/or carried out by an application facility. This application facility will preferably be a USAT. In this form of embodiment, the application facility knows nothing about the multimedia message multiple elements, but the application facility organizes the storage, in doing which the memory itself can be further initiated by the application facility. Two possibilities are conceivable here.

The first possibility is that the USAT makes a one-time request to the MMS UA to forward copies of the headers, i.e. both the multimedia message header and also all the multimedia message element headers in the incoming multimedia messages to it, that is to the USAT. At this point USAT analyzes the multimedia message element headers, in doing so determines the multimedia message multiple elements by reference to the new multimedia message element header and then requests the MMS UA to save the corresponding multimedia message multiple element on an available storage medium under the appropriate reference.

A second possibility is that the MMS UA forwards to USAT copies of the headers, i.e. both the multimedia message header and also the multimedia message element headers, if an appropriate header, inserted by the MMS RS, is specified in the multimedia message header. The analysis of the header by USAT, and the request to the MMS UA to effect the storage, then proceed as for the first possibility.

It is further conceivable that USAT undertakes not only the organization but also the actual storage activities. In this case too, both of the possibilities explained above are usable, with the difference that not only copies of the headers but the entire multimedia message is passed over to the USAT. The USAT then not only analyzes the header, but also stores on the UICC (or on the smart card which includes the USAT, as applicable) the multimedia message multiple elements as well, with the appropriate reference.

With the three possibilities explained above, the following overwrite rule can be applied: if a multimedia message multiple element is to be stored with a reference which already exists, then the old multimedia message multiple element should be overwritten. Using this rule it is also possible, for example, to update multimedia message multiple elements.

For the purpose of avoiding the transmission and storing away of multimedia message multiple elements it is, however, also conceivable that, even at the time of dispatch of the mobile station product, the MMS UA, the UICC, or some other storage medium which the MMS UA can access, multimedia message multiple elements are stored away on it with appropriate referencing.

In another embodiment of the present invention, if a multimedia message multiple element is already stored in a mobile station a reference to the multimedia message multiple element is inserted into a multimedia message which is to be transmitted to the mobile station. If, for example, a multimedia message is transmitted, from the MMS RS to the MMS UA, which is to include a particular multimedia message multiple element (which is stored in the associated mobile station with an appropriate reference), then this multimedia message multiple element will not be inserted in the MMS RS but instead an additional multimedia message header with the appropriate reference to it. This multimedia message is then communicated from the MMS RS to the mobile station.

Preferably, the insertion of a multimedia message multiple element will be undertaken in the mobile station by a user facility. The user facility concerned will preferably be an MMS UA. From the fact that the multimedia message contains a new multimedia message header, the MMS UA knows that it can read the appropriate multimedia message multiple element out from the appropriate storage medium under the corresponding reference, in order to then insert it into the multimedia message.

In a further embodiment, the insertion of a multimedia message multiple element is organized and/or carried out in the mobile station by an application facility. The application facility will preferably be a USAT. In this case it is not the user facility (MMS UA) but the application facility (USAT) which organizes the insertion of a multimedia message multiple element into a multimedia message. The insertion itself is, as before, carried out by the user facility. For this purpose, there are two conceivable possibilities: with the first possibility, the application facility makes a one-time request to the user facility to send copies of the headers for incoming multimedia messages to it—that is to the application facility. The application facility then analyzes the multimedia message header and in doing so finds an appropriate multimedia message header. There may even be several multimedia message headers of this type. At this point, the application facility requests the user facility to insert the corresponding referencable multimedia message multiple element into the multimedia message.

With the second possibility, the situation is that the user facility sends copies of the headers to the application facility if an appropriate header is specified in the multimedia message header. The analysis of the headers by the application facility, and the request to the user facility to insert the appropriate multimedia message multiple element, then proceed as for the possibility explained above.

The application facility (USAT) can undertake not only the organization but also the actual insertion of a multimedia message multiple element. In this case too, both of the possibilities explained above are usable, with the difference that not only copies of the headers but the multimedia message is forwarded to the application facility. The application facility would thus not only analyze the headers but would in addition also load from the UICC (or the smart card on which is the USAT, as applicable) multimedia message multiple elements corresponding to the references, insert them into the multimedia message and then pass the modified multimedia message back to the user facility.

If the main part of the multimedia message which is to be transmitted includes a programming-language-based presentation, for example an SMIL presentation, a network element (e.g. MMS RS) could also, as an alternative to introducing an additional multimedia message header, directly embed in the SMIL presentation the reference to the multimedia message multiple element stored in the terminal device. SMIL (Synchronize Multimedia Integration Language) is a programming language for specifying interactive audio-visual presentations. In such a case, the multimedia message multiple element would be called up from within the SMIL presentation when the multimedia message is opened or viewed, as applicable. In doing this, the additional multimedia message header is not inserted, and hence also the multimedia message multiple element is not physically inserted into the multimedia message. Instead, the reference is embedded in the SMIL presentation. An advantage of this is that when a multimedia message is presented the current multimedia message multiple element is displayed (e.g. if a multimedia message multiple element, for example an advertising message, is updated by overwriting between the receipt and the presentation of the multimedia message).

It is also conceivable for a reference to a multimedia message multiple element stored in the mobile station to be directly embedded in a multimedia message.

It is further possible that the additional functionalities of the network element (MMS RS) are undertaken by a server which is operated by a so-called MMS VASP (MMS Value Added Service Provider). In such a case, the multimedia message is initially transmitted from the network element (MMS RS) to the MMS VASP, which applies the necessary functionalities to the multimedia message. After this, the MMS VASP transmits the multimedia message back to the network element, the multimedia message possibly modified by the appending of headers. The network element (MMS RS) then communicates the multimedia message to the user facility (MMS UA).

The following rule could, furthermore, be advantageously applied: if a multimedia message multiple element is not present with its reference in the memory, then no insertion is made. In addition, it is conceivable for the user facility (e.g. MMS UA) to transmit to the network element (e.g. MMS RS) an error message which indicates that the multimedia message multiple element which was referenced is missing. One possibility would then be that, as a result of the error message, the network element either makes no further reference to this multimedia message multiple element, or that the network element effects a communication of the missing multimedia message multiple element, to avoid this error for any further multimedia messages.

The network element's choice as to whether and which multimedia message multiple element to reference with the additional multimedia message header, or which multimedia message multiple element should be inserted into a multimedia message, can be made dependent on certain conditions.

This procedure should preferably be applied when the multi-media message multiple elements concerned are advertising messages, because in such a case advertisements should be sent selectively. The choice can be made dependent, for example, on the transmit address. For example, if the sender is a particular network supplier, then an advertising message for this network supplier should also be inserted. However, the choice can also be made dependent on the receiver's whereabouts. For example, if the receiver is near to a particular supermarket, then an advertising message for this particular supermarket should also be inserted.

The present invention relates further to a mobile station for use with a method in accordance with the invention and a mobile station for use in a system in accordance with the invention.

One advantage of the present invention is that multimedia message multiple elements which need to be communicated repeatedly from the network element (e.g. MMS RS) to the same user facility (e.g. MMS UA) need only be transmitted once over the air interface. This achieves the effect of avoiding the repeated transportation of the same data, i.e. the same multimedia message multiple elements, and hence valuable resources on the air interface are saved. Particularly in the case of resource-intensive multimedia message multiple elements in multimedia form, this effects a clear reduction in the data to be transmitted for a multimedia message.

With the present invention, the network operator has the possibility of inserting a particular multimedia message multiple element into several multimedia messages as an advertising message before the multimedia message is presented to the user of the mobile station. This avoids burdening the air interface time and again with the same advertising message.

BRIEF DESCRIPTION OF THE DRAWINGS

The invention is explained in more detail below with reference to the attached drawings and exemplary embodiments. The drawings show.

DETAILED DESCRIPTION OF THE INVENTION

FIG. 1 has already been explained in the introduction to the description.

Figure 2:
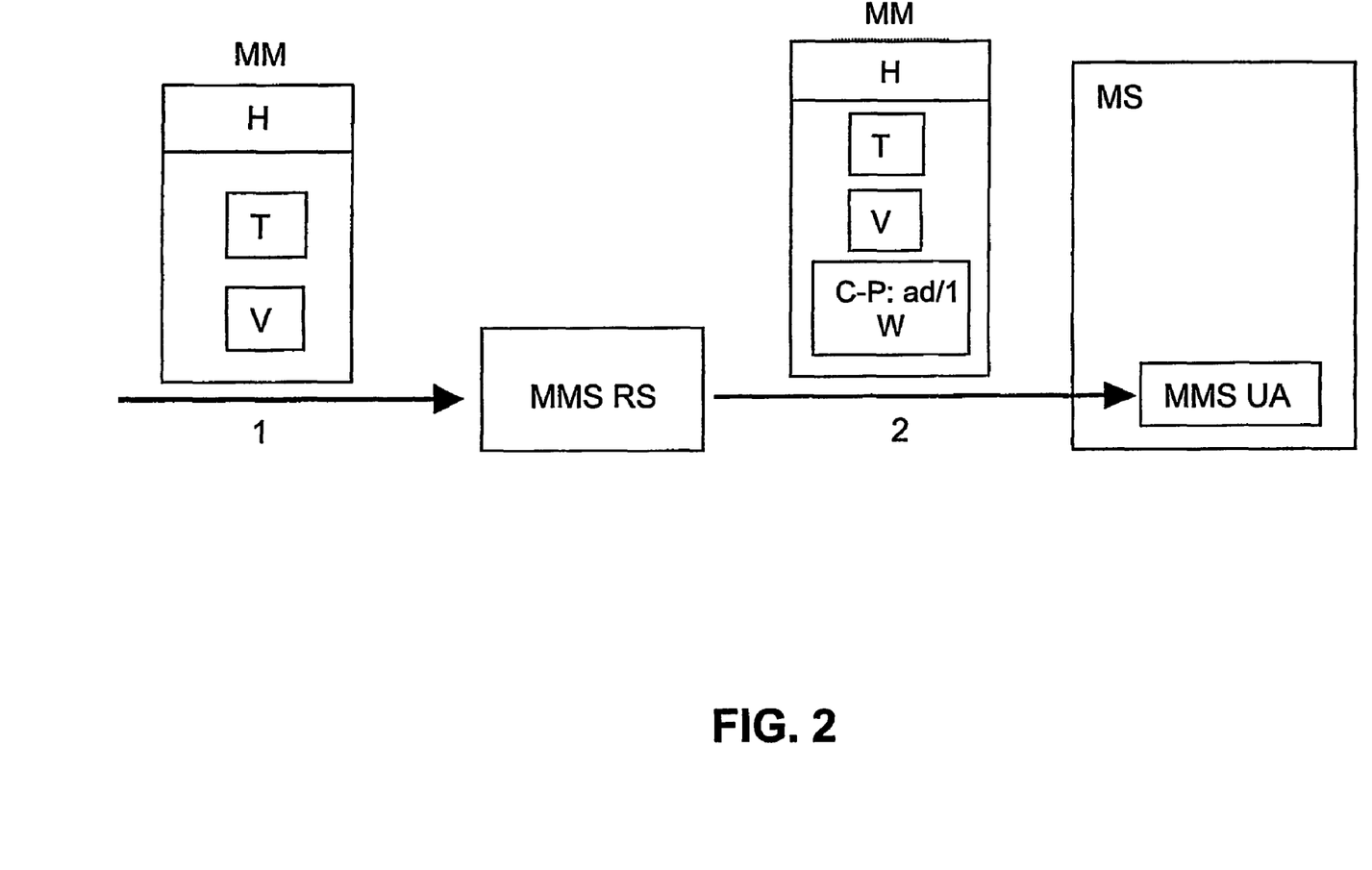
FIG. 2 an exemplary embodiment of the transmission of a multimedia message.

In a first exemplary embodiment, the insertion of multimedia message multiple elements into a multimedia message can be subdivided into four steps:

In a first step, a multimedia message is to be sent to a user. For this purpose, the multimedia message initially arrives at the MMS RS which is responsible for it. Before the MMS RS forwards this multimedia message to this user's MMS UA, it inserts an advertising message into this multimedia message as a multimedia message multiple element. In doing so, the multimedia message element header is given the entry "C-P: ad/1", for example. Following this, the MMS RS communicates this multimedia message to the MMS UA by means of a message "MMS_retrieve.RES", 2. This operation is shown in FIG. 2.

In a second step the MMS UA, after it has received the multimedia message, analyzes the multimedia message element headers and in doing so finds the multimedia message element header "C-P: ad/1" which belongs to the multimedia message multiple element with the advertising message. At this point, the MMS UA saves this multimedia message multiple element under the appropriate reference (here, for example, "ad/1") on an available storage medium. The operation of the second step is shown, for example, in FIG. 3. After this, the MMS UA can further process the multimedia message.

In a third step, the MMS RS wishes once again to insert the first multimedia message multiple element with the reference "ad/1" into a multimedia message. However, instead of once again inserting the multimedia message multiple element (as under step one), the MMS RS now inserts an additional multimedia message header "X-MMS-Insert-MM_Element: ad/1", and then sends this multimedia message on to the MMS UA.

Figure 4:
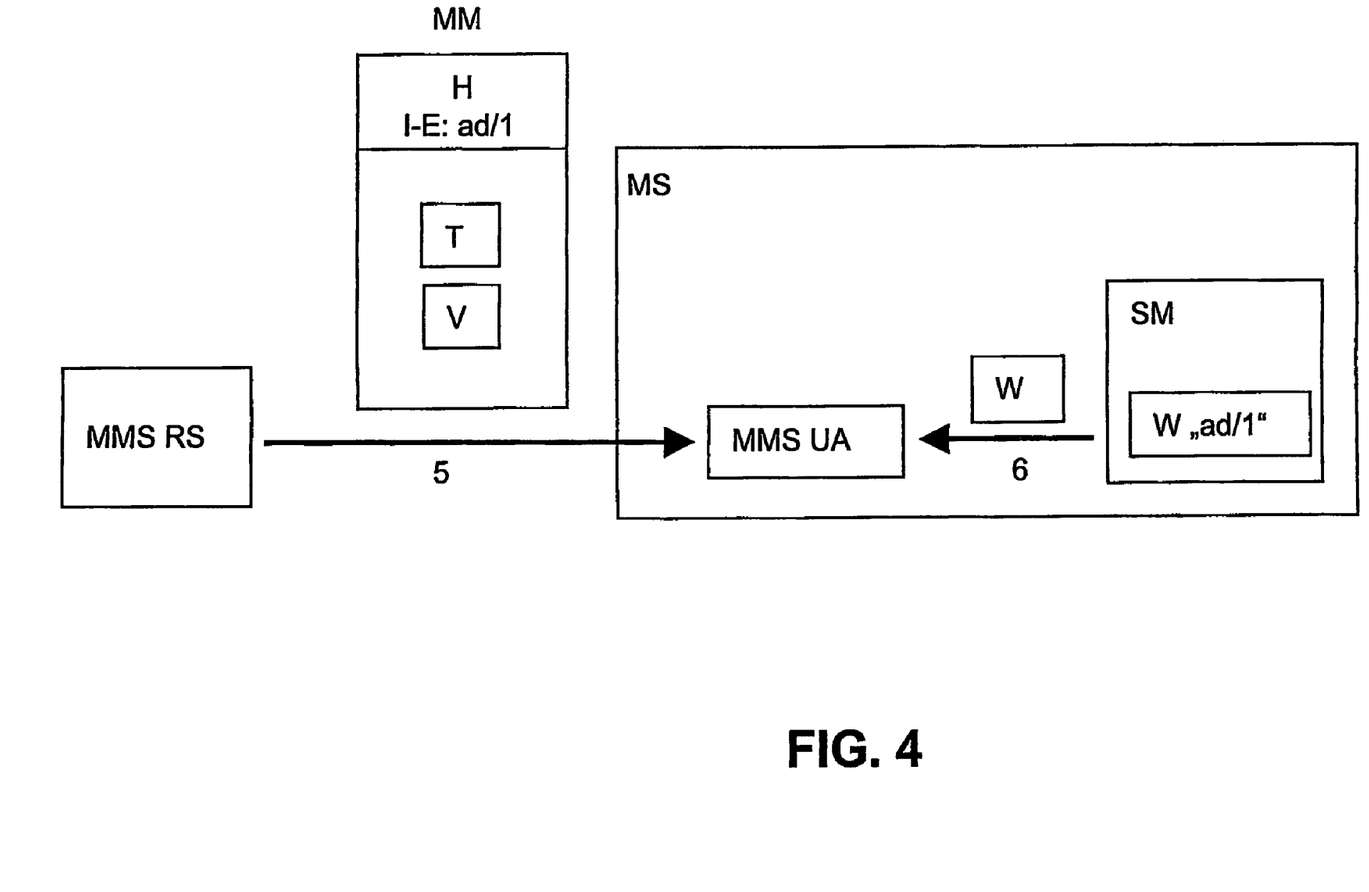
FIG. 4 an exemplary embodiment of the transmission of a multimedia message with an additional multimedia message element header.

In a fourth step, after it has received the multimedia message the MMS UA analyzes the multimedia message element headers, in doing which is finds the multimedia message header "X-MMS-Insert-MM_Element: ad/1". Thereupon, the MMS UA reads this multimedia message multiple element from the storage medium under the appropriate reference (here for example "ad/1"), and inserts this multimedia message multiple element into the multimedia message. The operation of the fourth step is shown in FIG. 4. After this, the MMS UA can further process the multimedia message.

In a second exemplary embodiment of the present invention, the USAT makes a one-time request to the MMS UA to forward copies of the headers (both of the multimedia message header and also of all the multimedia message element headers) in all the incoming multimedia messages to it—that is to the USAT.

The first step is identical with the first step of the first exemplary embodiment.

Figure 5:
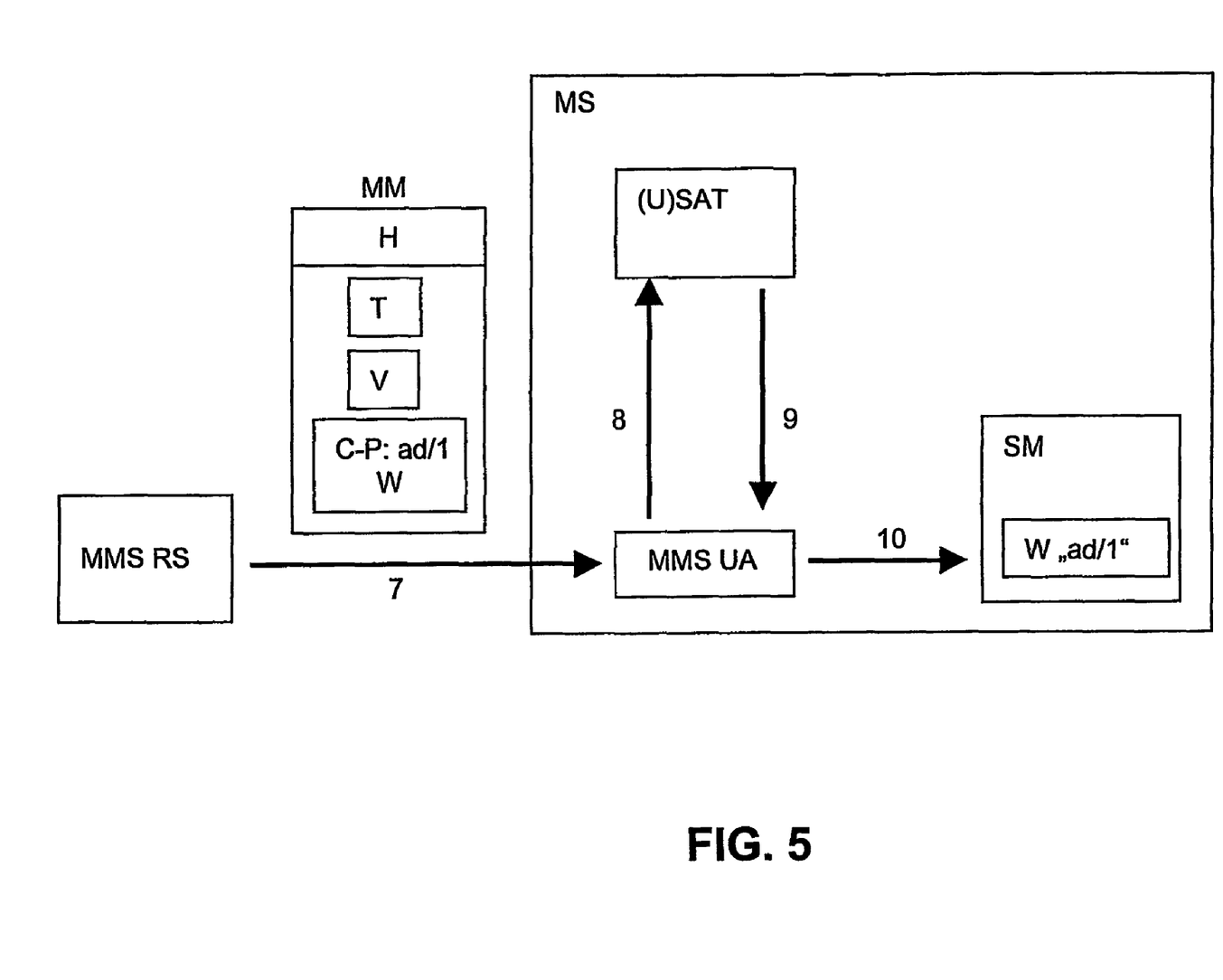
FIG. 5 an exemplary embodiment of the transmission of a multimedia message with an additional multimedia message multiple element.

In the second step the MMS UA, after it has received the multimedia message, gives copies of the headers to the USAT (because it was previously asked to do so by the USAT, see the introduction to the second exemplary embodiment). The USAT analyzes the multimedia message element headers, and in doing so determines all the multimedia message multiple elements which are present by reference to the new multimedia message element header (e.g. "C-P:ad/1") and then requests the MMS UA to save the corresponding MM multiple elements on an available storage medium under the appropriate reference (here for example "ad/1"). The operation of the second step is shown in FIG. 5. After this, the MMS UA can further process the multimedia message.

The third step which follows is identical to method step three of the first exemplary embodiment.

Figure 6:
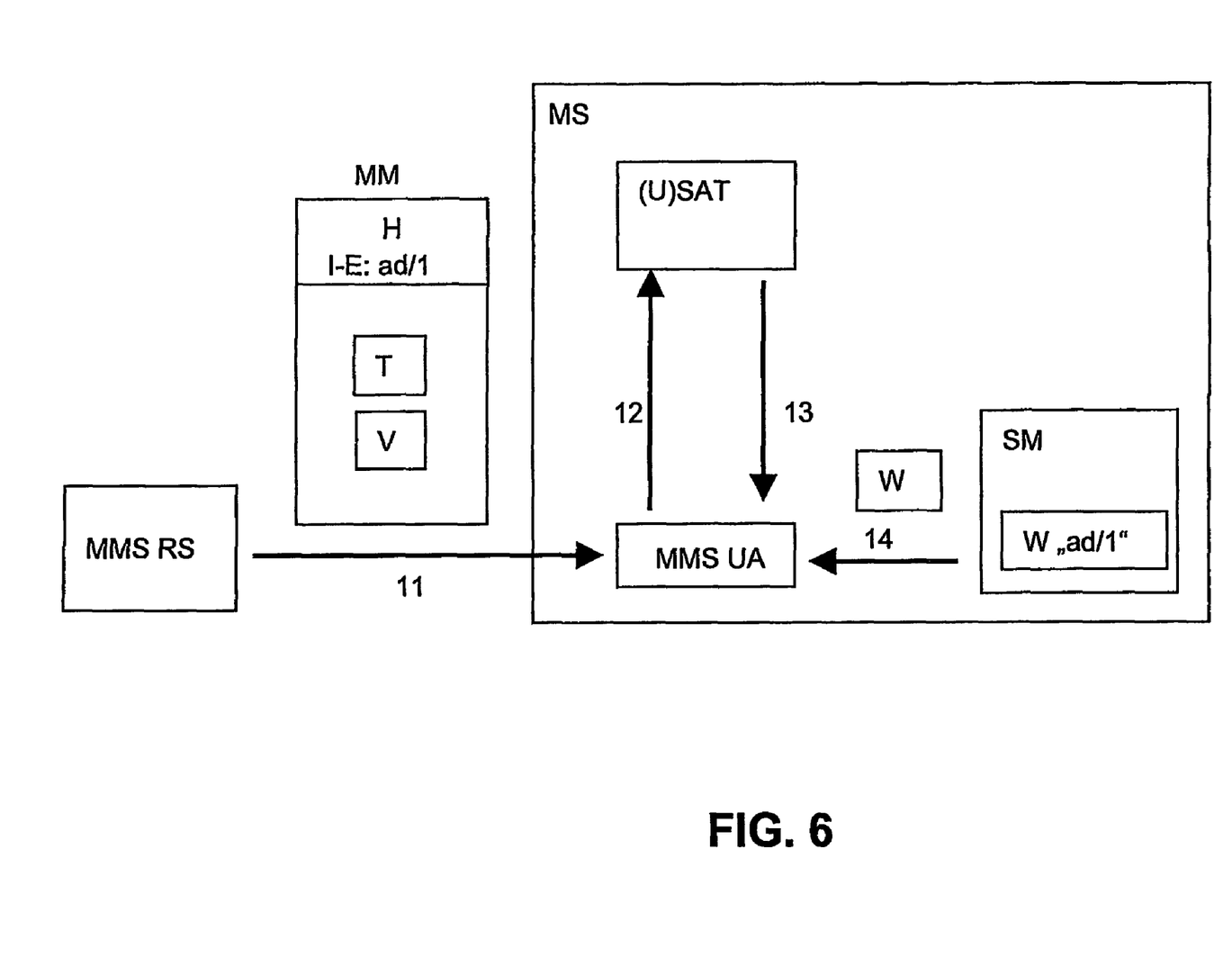
FIG. 6 an exemplary embodiment of the transmission of a multimedia message with an additional multimedia message header.

In the fourth step, the MMS UA passes copies of the headers on to the USAT. The USAT then analyzes the multimedia message header and in doing so finds the multimedia message header "X-MMS-Insert-MM_Element: ad/1". Thereupon, the USAT requests the MMS UA to insert the correspondingly referenced multimedia message multiple element "ad/1" into the multimedia message. Hence, the MMS UA reads this multimedia message multiple element from the storage medium under the corresponding reference "ad/1", and inserts this multimedia message multiple element into the multimedia message. This operation is shown in FIG. 6. After this, the MMS UA can further process the multimedia message.

In a third exemplary embodiment of the present invention, the USAT makes a one-time request to the MMS UA to pass on copies of the headers (both of the multimedia message header and also of the multimedia message element headers) in all the incoming multimedia messages to it—that is to the USAT—if an appropriate header (e.g. "X-MMS-Intended-_for_USAT:YES") is specified in the multimedia message header.

In a first step, a multimedia message is to be sent to a user. For this purpose, the multimedia message initially arrives at the MMS RS which is responsible for it. Before the MMS RS forwards this multimedia message to this user's MMS UA, it inserts an advertising message into this multimedia message as a multimedia message multiple element. In doing so, the multimedia message element header is given the entry "C-P: ad/1", for example, and the multimedia message header the entry "X-MMS-Intended_for_USAT: YES", for example. Following this, the MMS RS communicates this multimedia message to the MMS UA by means of a message "MM1_retrieve.RES", 2.

In the second step, the MMS UA passes on copies of the headers to the USAT, because the condition is satisfied, that the header "X-MMS-Intended_for_USAT: YES" is inserted in the multimedia message. This second step thus corresponds to the second step in the second exemplary embodiment.

In a third step, the MMS RS wishes once again to insert the first multimedia message multiple element with the reference "ad/1" into a multimedia message. However, instead of once again inserting the multimedia message multiple element (as under step one), the MMS RS now inserts an additional multimedia message header "X-MMS-Insert-MM_Element: ad/1", and the additional multimedia message header "X-MMS-Intended_for_USAT: YES", and then sends this multimedia message on to the MMS UA.

In the fourth step, the MMS UA forwards copies of the headers to the USAT because the condition is satisfied, that the header "X-MMS-Intended_for_USAT: YES" is inserted in the multimedia message. This fourth step thus corresponds to the fourth step in the previous exemplary embodiment.

A fourth exemplary embodiment is a variant of the second or third exemplary embodiments respectively.

Figure 7:
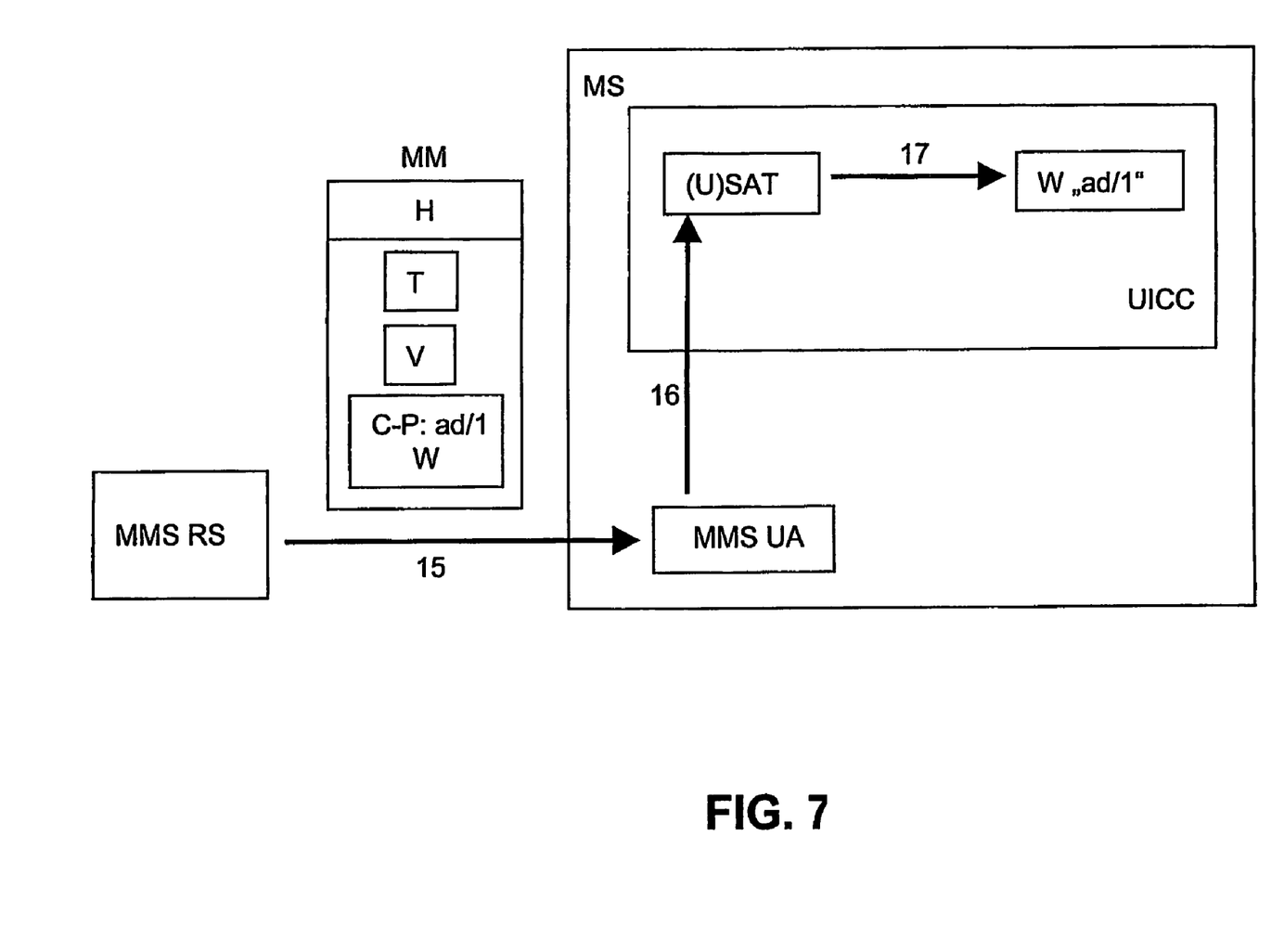
FIG. 7 an exemplary embodiment of the transmission of a multimedia message with the insertion of an additional multimedia message multiple element.

Compared with exemplary embodiments two and three, the second step changes in such a way that the MMS UA passes on to the USAT not only copies of the headers but a copy of the complete multimedia message (with the variant of exemplary embodiment two as a result of the preceding one-time request by the USAT, and with the variant of exemplary embodiment three as a result of the header "X-MMS-Intended_for_USAT: YES"). The USAT analyzes the multimedia message element headers, and in doing so determines the multimedia message multiple elements which are present by reference to the new multimedia message element header (e.g. "C-P:ad/1") and then saves the corresponding MM multiple elements on an available storage medium, e.g. UICC (or the smart card which includes the USAT, as applicable) under the appropriate reference (here for example "ad/1"). The operation of the second step is shown in FIG. 7. After this, the MMS UA can further process the multimedia message.

Figure 8:
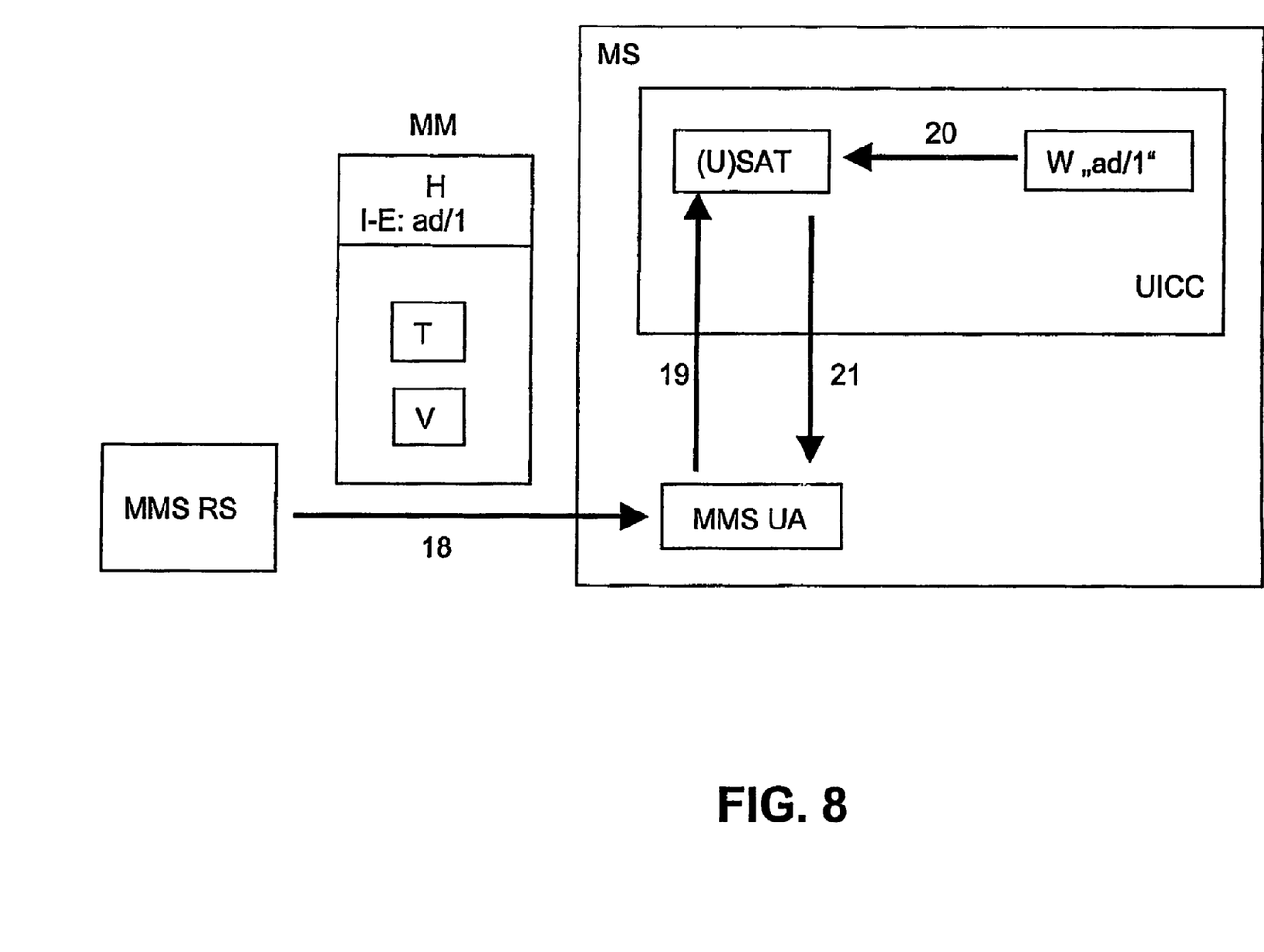
FIG. 8 an exemplary embodiment of the transmission of a multimedia message with the insertion of an additional multimedia message header.

Compared with exemplary embodiments two and three, the fourth step changes in such a way that the MMS UA passes on to the USAT not only copies of the headers but the complete multimedia message (with the variant of exemplary embodiment two as a result of the preceding one-time request by the USAT, and with the variant of exemplary embodiment three as a result of the header "X-MMS-Intended_for_USAT: YES"). The USAT then analyzes the multimedia message element header, and in doing so finds the multimedia message header "X-MMS-Insert-MM_Element: ad/1". Hence, the USAT reads this multimedia message multiple element from the storage medium under the corresponding reference "ad/1", and inserts this multimedia message multiple element into the multimedia message. After this the USAT returns the multimedia message, modified in this way, to the MMS UA. This operation is shown in FIG. 8. After this, the MMS UA can further process the multimedia message.

Figure 9:
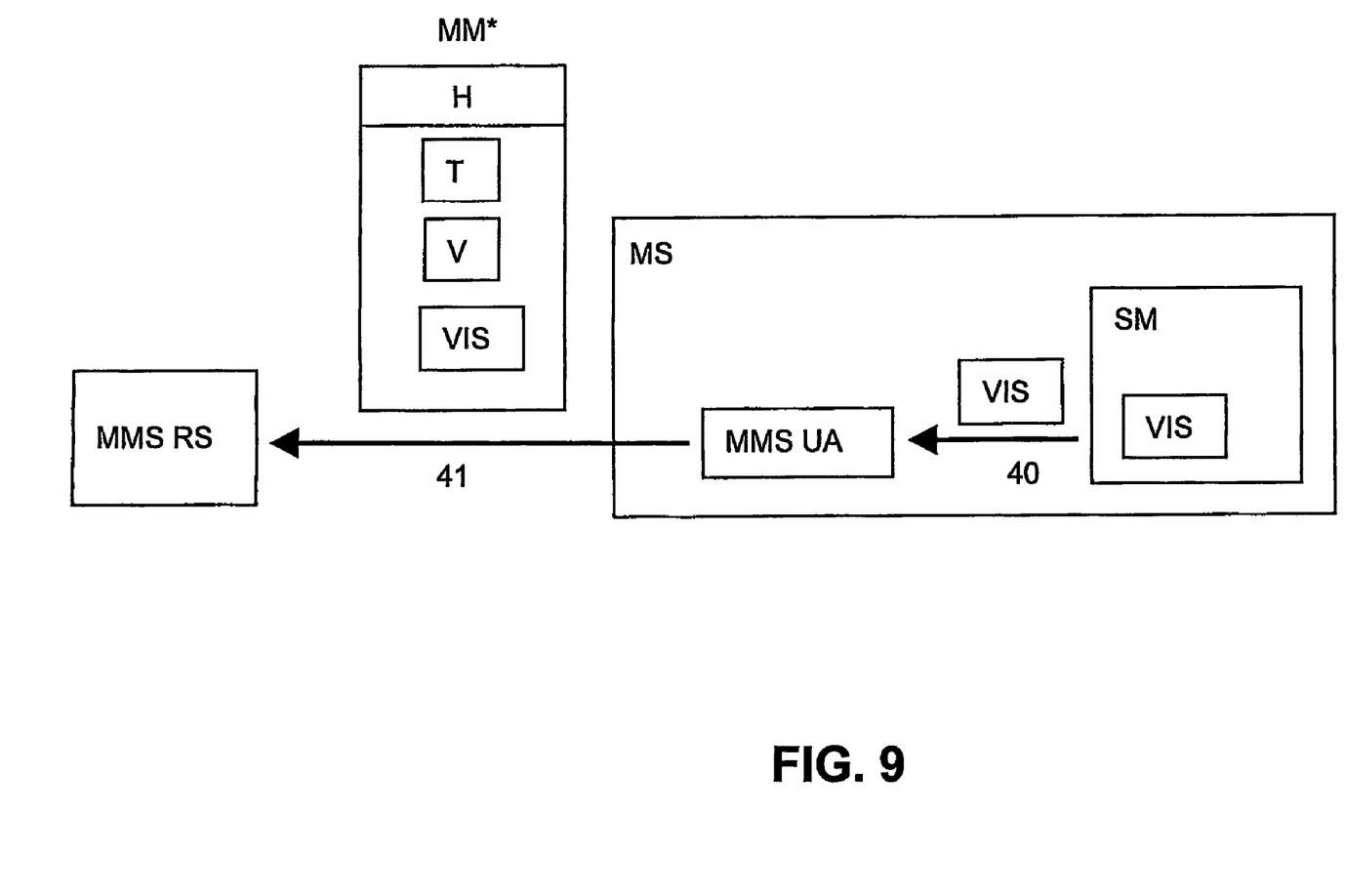
FIG. 9 an exemplary embodiment of the insertion of a multimedia message multiple element into a multimedia message.

In a fifth exemplary embodiment, consideration is now given to the case that the MMS RS does not send a multimedia message to the MMS UA but the reverse, the MMS UA sends a multimedia message to the MMS RS. Here, it is conceivable that the MMS UA or USAT, as applicable, inserts a multimedia message multiple element into a multimedia message before the multimedia message is forwarded to the MMS RS. The user can then, for example, insert a file with his visiting card into a particular multimedia message which he sends off, or into all of them. This is shown in FIG. 9.

List 1:
X-Mms-Message-Type: m-send-req
. . .
X-Mms-Delivery-Report: Yes
From: markus.trauberg@sal.siemens.de
To: andreas.schmidt@sal.siemens. de
Date: Fri, 7 Jul 2000 20:59:30 +0100
Subject: A multimedia message
nEntries=2
HeaderLen=13
DataLen=31
Content-Type: text/plain;
name="datei.txt"
"Hallo Andreas, how are you?"
HeaderLen=11
DataLen=2736
Content-Type: video;
name="film.vid"
". . . Video-Data . . . "

List 2:
X-Mms-Message-Type: m-send-re q
. . .
X-Mms-Delivery-Report: Yes
From: markus.trauberg@sal.siemens.de
To: andreas.schmidt@sal.siemens.de
Date: Fri, 7 Jul. 2000 20:59:30 +0100
Subject: A multimedia message
nEntries=3
HeaderLen=13
DataLen=31
Content-Type: text/plain;
name="datei.txt"
"Hallo Andreas, how are you?"
HeaderLen=11
DataLen=2736
Content-Type: video;
name="film.vid"
". . . Video-Data . . . "
HeaderLen=13
DataLen=56
Content-Type: text/plain;
C-P: ad/1;
name="siemens.txt"
"This MM is sponsored by: Siemens mobile—be inspired"

List 1 shows a multimedia message in accordance with the state of the art. The upper part is a so-called multimedia message header. "nEntris" specifies how many multimedia message elements are inserted into the multimedia message. After this comes the multimedia message elements, each with its own multimedia message element header and content. Both the MMS RS and the MMS UA have, in accordance with the state of the art, the functionality for inserting a multimedia message element into an existing multimedia message, and/or to extend and/or change the multimedia message header and/or a multimedia message element header. An example of a change compared to List 1 is shown in List 2 in boldface type. Here, the multimedia message element which is inserted has the file format "Text", but other file formats are also conceivable.

List 3:
X-Mms-Message-Type: m-send-req
X-Mms-Delivery-Report: Yes
From: markus.trauberg@sal.siemens.de
To: andreas.schmidt@sal.siemens.de
Date: Fri, 7 Jul 2000 20:59:30 +0100
Subject: A multimedia message
nEntries=3
HeaderLen=13
DataLen=31
Content-Type: text/plain;
name="datei.txt"
"Hallo Andreas, how are you?"
HeaderLen=11
DataLen=2736
Content-Type: video;
name="film.vid"
". . . . Video-Data . . . "
HeaderLen=13
DataLen=56
Content-Type: text/plain;
C-P: ad/1;
name="siemens.txt"
"This MM is sponsored by: Siemens mobile—be inspired"
List 4:
X-Mms-Message-Type: m-send-req
X-Mms-Delivery-Report: Yes
X-MMS-Empfänger-Sichtbarkeit: Nein
To: andreas.schmidt@sal.siemens.de
Date: Fri, 7 Jul 2000 20:59:30 +0100
nEntries=1
HeaderLen=13
DataLen=58
Content-Type: text/plain;
C-P: ad/2;
name="siemens2.txt"
"This MM is sponsored by: Siemens Hausgeräte"
List 5:
X-Mms-Message-Type: m-send-req
. . .
X-Mms-Delivery-Report: Yes
X-MMS-Empfänger-Sichtbarkeit: Nein
To: andreas.schmidt@sal.siemens.de
Date: Fri, 7 Jul 2000 20:59:30 +0100
nEntries=2
HeaderLen=13
DataLen=56
Content-Type: text/plain;
C-P: ad/1;
name="siemens.txt"
"This MM is sponsored by: Siemens mobile—be inspired"
HeaderLen=13
DataLen=58
Content-Type: text/plain;
C-P: ad/2;
name="siemens2.txt"
"This MM is sponsored by: Siemens Hausgeräte"

Lists 3, 4 and 5 show examples of three multimedia messages with the help of which multimedia message multiple elements can be communicated from the MMS RS to the MMS UA. List 3 shows a first multimedia message which is to include the multimedia message multiple element with the name "Siemens.txt". This is given the multimedia message multiple element with the additional multimedia message element header "C-P: ad/1" inserted. List 4 shows an example in which an extra multimedia message is sent off in order to communicate this multimedia message multiple element with the additional multimedia message element header "C-P". The additional multimedia message header "X-MMS-Empfänger-Sichtbarkeit: Nein" [X-MMS-Receiver-Visibility: No] ensures that this multimedia message is later not subject to further processing as a "normal" multimedia message by the MMS UA. In the example as shown in List 5 it is also possible to communicate several multimedia message multiple elements simultaneously using one multimedia message.

In the examples as shown in lists 3, 4 and 5, the additional multimedia message element header "C-P: ad/1" indicates that it is a multimedia message multiple element, and also specifies a unique identification number so that it can later be referenced unambiguously.

List 6:
X-Mms-Message-Type: m-send-req
X-Mms-Transaction-ID: 543210
X-Mms-Version: 1.0
X-Mms-Message-Class: Personal
X-Mms-Expiry: 36000
X-Mms-Priority: Normal
X-Mms-Sender-Visibility: Show
X-Mms-Delivery-Report: Yes
From: markus.trauberg@sal.siemens.de
To: andreas.schmidt@sal.siemens.de
Date:Fri, 7 Jul 2000 20:59:30 +0100
Subject: A multimedia message
nEntries=2
HeaderLen=13
DataLen=31
Content-Type: text/plain;
name="datei.txt"
"Hallo Andreas, how are you?"
HeaderLen=11
DataLen=2736
Content-Type: video;
name="film.vid"
". . . Video-Data . . . "
List 7:
X-Mms-Message-Type: m-send-req
X-Mms-Transaction-ID: 543210
X-Mms-Version: 1.0
X-Mms-Message-Class: Personal
X-Mms-Expiry: 36000
X-Mms-Priority: Normal
X-Mms-Sender-Visibility: Show
X-Mms-Delivery-Report: Yes
X-MMS-insert-MM_Element: ad/1
From: markus.trauberg@sal.siemens.de
To: andreas.schmidt@sal.siemens.de
Date:Fri, 7 Jul 2000 20:59:30 +0100
Subject: A multimedia message
nEntries=2
HeaderLen=13
DataLen=31
Content-Type: text/plain;
name="datei.txt"
"Hallo Andreas, how are you?"
HeaderLen=11
DataLen=2736
Content-Type: video;

name="film.vid"
" . . . Video-Data . . . "
List 8:
X-Mms-Message-Type: m-send-req
X-Mms-Transaction-ID: 543210
X-Mms-Version: 1.0
X-Mms-Message-Class: Personal
X-Mms-Expiry: 36000
X-Mms-Priority: Normal
X-Mms-Sender-Visibility: Show
X-Mms-Delivery-Report: Yes
X-MMS-insert-MM_Element: ad/1
From: markus.trauberg@sal.siemens.de
To: andreas.schmidt@sal.siemens.de
Date:Fri, 7 Jul 2000 20:59:30 +0100
Subject: A multimedia message
nEntries=3
HeaderLen=13
DataLen=31
Content-Type: text/plain;
name="datei.txt"
"Hallo Andreas, how are you?"
HeaderLen=11
DataLen=2736
Content-Type: video;
name="film.vid"
" . . . Video-Data . . . "
HeaderLen=13
DataLen=56
Content-Type: text/plain;
name="siemens.txt"
"This MM is sponsored by: Siemens mobile—be inspired"

List 6 shows once again a known multimedia message.

List 7 shows how, instead of again inserting a multimedia message multiple element, which is stored in the mobile radio device, into the multimedia message, the MMS RS inserts an additional multimedia message header "X-MMS-Insert-MM_Element: ad/1".

From List 8 it can be seen that the MMS UA then knows that it must insert the multimedia message multiple element with the reference "ad/1" into the multimedia message before it can process the latter any further.

FIGS. 2 to 9 are explained in more detail below. In the explanations which follow, labels which are the same have the same meaning.

FIG. 2 shows a multimedia message MM with a header H, the two MM elements T (text) and V (video file). The MMS RS receives 1 the MM and inserts into the MM an additional MM multiple element W with the MM element header "C-P: ad/1" as an advertising message. This modified MM is forwarded 2 to the MMS UA in the mobile station MS.

Figure 3:
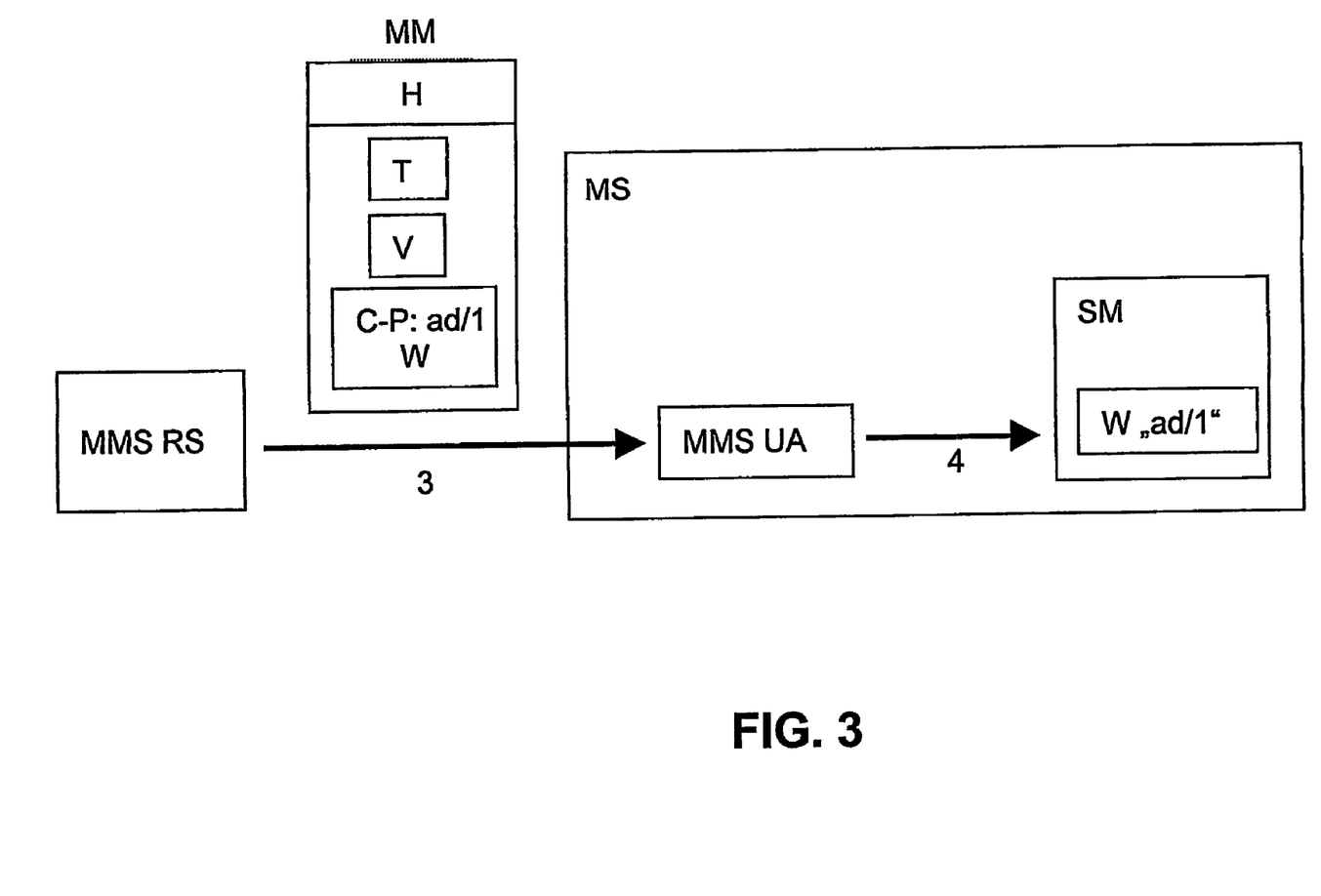
FIG. 3 an exemplary embodiment of the transmission of a multimedia message with a multimedia message element header.

FIG. 3 shows that, after the MMS RS has inserted an additional MM multiple element W with the MM element header "C-P:ad/1" into the MM as an advertising message, the modified MM is then forwarded 3 to the MMS UA in the mobile station MS. Because of the new MM element header "C-P:ad/1", the MMS UA then stores 4 the MM multiple element with the advertising message in a storage medium SM in the mobile station MS, with the reference "ad/1".

FIG. 4 shows that, after the MMS RS has inserted an additional MM header "I-E:ad/1", the modified MM is then forwarded 5 to the MMS UA in the mobile station MS. Because of this new MM header, the MMS UA then reads out 6 from the storage medium SM the MM multiple element with the reference "ad/1", and inserts it into the MM.

FIG. 5 shows how the MMS RS inserts an additional MM multiple element W with the MM element header "C-P:ad/1" into the MM. The MMS passes copies 8 of the headers to the (U)SAT, which thereupon finds the MM element header "C-P:ad/1". The (U)SAT then requests 9 the MMS UA to store away 10 the corresponding MM multiple element on an available storage medium SM in the mobile station MS with the reference "ad/1".

FIG. 6 shows how the MMS RS inserts an additional MM header "I-E:ad/1" into the MM. The MMS UA passes copies 12 of all the headers to the (U)SAT. This then finds the MM header "I-E:ad/1". As a result, the (U)SAT requests 13 the MMS UA to read the appropriate MM multiple element "ad/1" from the storage medium SM and to insert 14 the appropriate MM multiple element into the MM.

FIG. 7 shows the insertion by the MMS RS of an additional MM multiple element W with the MM element header "C-P: ad/1" into the MM. The MMS UA passes 16 a copy of the complete MM to the (U)SAT. The (U)SAT then finds the MM element header "C-P:ad/1". As a result the USAT stores away 17 the corresponding MM multiple element on the UICC with the reference "ad/1". The MMS UA can then further process the MM.

FIG. 8 shows the insertion of an additional MM header "I-E:ad/1" by the MMS RS. The MMS UA passes 19 the complete MM across to the USAT. This then finds the MM header "I-E:ad/1". As a result, the USAT reads the corresponding MM multiple element "ad/1" from the UICC (cf. 20), inserts the corresponding MM multiple element into the MM and returns 21 the modified MM to the MMS UA. The MMS UA can then further process the MM.

Finally, FIG. 9 shows how the MMS UA inserts 40 an MM multiple element VIS, e.g. a visiting card, into the MM. After this, the MMS UA communicates the modified MM* to the MMS RS with the help of the message 41.

The invention claimed is:

1. A method for inserting at least one multimedia message multiple element into a multimedia message, comprising:
   receiving a first multimedia message at a network element;
   at the network element, inserting at least one multimedia message multiple element into the first multimedia message;
   transmitting the first multimedia message including the at least one multimedia message multiple element from the network element to a mobile station;
   storing the received at least one multimedia message multiple element at the mobile station;
   after transmitting the first multimedia message that includes the at least one multimedia message multiple element from the network element to the mobile station:
   transmitting a plurality of additional multimedia messages not including the at least one multimedia message multiple element from the network element to the mobile station; and
   at the mobile station, inserting the stored at least one multimedia message multiple element into each of the plurality of additional multimedia messages, such that the at least one multimedia message multiple element is sent only once from the network element to the mobile station and is inserted at the mobile station into each of the plurality of additional multimedia messages;
   such that the same network element (a) inserts the at least one multimedia message multiple element into the first multimedia message and transmits the first multimedia message including the at least one multimedia message multiple element to the mobile station, and (b) transmits the plurality of additional multimedia messages not including the at least one multimedia message multiple element to the mobile station.

2. The method in accordance with claim 1, wherein the mobile station does not insert the at least one multimedia message multiple element into one or more other multimedia messages received at the mobile station after the at least one multimedia message multiple element is received at the mobile station.

3. The method in accordance with claim 1, further comprising inserting, at the mobile station, the at least one multimedia message multiple element into at least one multimedia message that was transmitted to the mobile station before the transmission of at least one multimedia message multiple element to the mobile station.

4. The method in accordance with claim 1, wherein numerous multimedia message multiple elements are transmitted from the network element to the mobile station in one multimedia message prior to the transmission of the plurality of additional multimedia messages.

5. The method in accordance with claim 1, wherein a particular multimedia message has a data field which enables multiple multimedia message multiple elements to be distinguished.

6. The method in accordance with claim 5, wherein data in the multimedia message data field is appended in the network element.

7. The method in accordance with claim 1, wherein a particular multimedia message has a data field by which a multimedia message multiple element can be assigned to a message group.

8. The method in accordance with claim 1, wherein a particular multimedia message has a data field which includes data indicating whether the particular multimedia message is to be presented to a user of the mobile station.

9. The method in accordance with claim 1, wherein storage of the at least one multimedia message multiple element is carried out in the mobile station by a user facility.

10. The method in accordance with claim 1, wherein storage of the at least one multimedia message multiple element is organized and/or carried out in the mobile station by an application facility.

11. The method in accordance with claim 1, wherein a reference to the at least one multimedia message multiple element is inserted into each of the plurality of additional multimedia messages before being sent to the mobile station, the reference comprising an instruction to insert the at least one multimedia message multiple element into the respective multimedia message.

12. The method in accordance with claim 1, wherein the insertion of the at least one multimedia message multiple element into each of the plurality of additional multimedia messages is undertaken in the mobile station by a user facility.

13. The method in accordance with claim 1, wherein the insertion of the at least one multimedia message multiple element into each of the plurality of additional multimedia messages is organized and/or carried out in the mobile station by an application facility.

14. A system for inserting at least one multimedia message multiple element into a multimedia message, comprising:
 a network element configured for:
  receiving a first multimedia message;
  inserting at least one multimedia message multiple element into the first multimedia message;
  transmitting the first multimedia message including the at least one multimedia message multiple element from the network element to a mobile station such that the mobile station stores the received at least one multimedia message multiple element; and
  after transmitting the first multimedia message that includes the at least one multimedia message multiple element from the network element to the mobile station, transmitting a plurality of additional multimedia messages not including the at least one multimedia message multiple element from the network element to the mobile station;
  such that the network element (a) inserts the at least one multimedia message multiple element into the first multimedia message and transmits the first multimedia message including the at least one multimedia message multiple element to the mobile station, and (b) transmits the plurality of additional multimedia messages not including the at least one multimedia message multiple element to the mobile station; and
 the mobile station configured for inserting the stored at least one multimedia message multiple element into each of the plurality of additional multimedia messages, such that the system transmits the at least one multimedia message element once only from the network element to the mobile station and the mobile station inserts the received at least one multimedia message element into each of the received plurality of additional multimedia messages.

15. The system in accordance with claim 14, wherein the mobile station does not insert the at least one multimedia message multiple element into one or more other multimedia messages received at the mobile station after the at least one multimedia message multiple element is received at the mobile station.

16. The system in accordance with claim 15, wherein the mobile station has a user facility which undertakes the insertion of the at least one multimedia message multiple element into each of the plurality of additional multimedia messages.

17. The system in accordance with claim 14, wherein the mobile station is further configured for inserting the at least one multimedia message multiple element into at least one multimedia message that was transmitted to the mobile station before the transmission of at least one multimedia message multiple element to the mobile station.

18. The system in accordance with claim 14, wherein the system is such that numerous multimedia message multiple elements can be transmitted from the network element to the mobile station in one multimedia message prior to the transmission of the plurality of additional multimedia messages.

19. The system in accordance with claim 14, wherein a particular multimedia message has a data field which enables multiple multimedia message multiple elements to be distinguished.

20. The system in accordance with claim 19, wherein the system is such that data in the multimedia message data field can be appended in the network element.

21. The system in accordance with claim 14, wherein a particular multimedia message has a data field by which the at least one multimedia message multiple element can be assigned to a message group.

22. The system in accordance with claim 14, wherein a particular multimedia message has a data field which includes data indicating whether the particular multimedia message is to be presented to a user of the mobile station.

23. The system in accordance with claim 14, wherein the mobile station has a user facility which undertakes storage of the at least one multimedia message multiple element.

24. The system in accordance with claim 14, wherein the mobile station has an application facility which organizes and/or carries out the storage of the at least one multimedia message multiple element.

25. The system in accordance with claim 14, wherein the network element is configured to insert a reference to the at least one multimedia message multiple element into each of the plurality of additional multimedia messages before being sent to the mobile station, the reference comprising an instruction to insert the at least one multimedia message multiple element into the respective multimedia message.

26. The system in accordance with claim 14, wherein the mobile station has an application facility which organizes and/or carries out the insertion of the at least one multimedia message multiple element into each of the plurality of additional multimedia messages.

27. A mobile station for inserting at least one multimedia message multiple element into a plurality of received multimedia messages, the mobile station performing the following:
the mobile station receiving a first multimedia message including at least one multimedia message multiple element transmitted from a network element;
after receiving the at least one multimedia message multiple element from the network element, the mobile station receiving from the network element a plurality of additional multimedia messages not including the at least one multimedia message multiple element;
such that the first unit receives from the same network element both (a) the first multimedia message including the at least one multimedia message multiple element to the mobile station, and (b) the plurality of additional multimedia messages not including the at least one multimedia message multiple element; and
the mobile station inserting the at least one multimedia message multiple element into each of the plurality of additional multimedia messages, such that the at least one multimedia message multiple element is received from the network element only once and is inserted by the mobile station into each of the received plurality of additional multimedia messages.

28. A mobile station in accordance with claim 27, wherein the insertion of the at least one multimedia message multiple element into each of the plurality of additional multimedia messages is organized and/or carried out automatically by an application facility in the mobile station.

29. A mobile station in accordance with claim 27, wherein the application facility comprises a USAT (USIM Application Toolkit) application.

30. A mobile station in accordance with claim 27, wherein the insertion of the at least one multimedia message multiple element into each of the plurality of additional multimedia messages is organized and/or carried out automatically by a user facility in the mobile station.

31. A mobile station in accordance with claim 27, wherein the user facility comprises a Multimedia Messaging Service (MMS) User Agent.

32. A mobile station for inserting at least one multimedia message multiple element into a plurality of received multimedia messages, the mobile station comprising:
a first unit for:
receiving a first multimedia message including at least one multimedia message multiple element transmitted from a network element to the mobile station; and
after receiving the at least one multimedia message multiple element from the network element, receiving from the network element a plurality of additional multimedia messages not including the at least one multimedia message multiple element;
such that the first unit receives from the same network element both (a) the first multimedia message including the at least one multimedia message multiple element to the mobile station, and (b) the plurality of additional multimedia messages not including the at least one multimedia message multiple element; and
a second unit for inserting the at least one multimedia message multiple element into each of the plurality of additional multimedia messages, such that the at least one multimedia message multiple element is received once only from the network element and is inserted by the mobile station into each of the received plurality of additional multimedia messages.

33. A mobile station in accordance with claim 32, wherein the second unit comprises an application facility in the mobile station.

34. A mobile station in accordance with claim 32, wherein the second unit comprises a user facility in the mobile station.

35. Software embodied in tangible computer-readable storage at a mobile station and executable by one or more processors to:
receive a first multimedia message including at least one multimedia message multiple element transmitted from a network element to the mobile station;
receive from the network element a plurality of multimedia messages not including the at least one multimedia message multiple element;
such that both (a) the first multimedia message including the at least one multimedia message multiple element to the mobile station, and (b) the plurality of additional multimedia messages not including the at least one multimedia message multiple element to the mobile station are received at the mobile station from the same network element; and
automatically insert the at least one multimedia message multiple element into each of the plurality of additional multimedia messages, such that the at least one multimedia message multiple element is received from the network element only once and is inserted by the mobile station into each of the received plurality of additional multimedia messages.

36. The software embodied in tangible computer-readable storage according to claim 35, wherein the software is implemented as an application facility.

37. The software embodied in tangible computer-readable storage according to claim 36, wherein a USAT (USIM Application Toolkit) application is provided for performing at least the step of inserting the at least one multimedia message multiple element into each of the plurality of additional multimedia messages.

38. The software embodied in tangible computer-readable storage according to claim 37, wherein the USAT is embodied in memory on a removable smart card.

* * * * *